(12) United States Patent
Diepersloot et al.

(10) Patent No.: US 9,192,935 B2
(45) Date of Patent: Nov. 24, 2015

(54) SLIDE TRANSFER DEVICE

(75) Inventors: David Diepersloot, Scotts Valley, CA (US); Raphael Hebert, Santa Cruz, CA (US); David Moriconi, Ben Lomond, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 14/236,778

(22) PCT Filed: Aug. 21, 2012

(86) PCT No.: PCT/EP2012/066267
§ 371 (c)(1),
(2), (4) Date: Feb. 3, 2014

(87) PCT Pub. No.: WO2013/034431
PCT Pub. Date: Mar. 14, 2013

(65) Prior Publication Data
US 2014/0169931 A1    Jun. 19, 2014

Related U.S. Application Data

(60) Provisional application No. 61/533,096, filed on Sep. 9, 2011.

(51) Int. Cl.
*B01L 9/00* (2006.01)
*G02B 21/34* (2006.01)

(52) U.S. Cl.
CPC . *B01L 9/52* (2013.01); *G02B 21/34* (2013.01); *B01L 2200/022* (2013.01); *B01L 2300/0822* (2013.01)

(58) Field of Classification Search
CPC ....... B01L 2200/025; B01L 9/52; G01N 1/30; G02B 21/34

USPC .................. 414/416.02; 211/41.13
See application file for complete search history.

(56) References Cited

U.S. PATENT DOCUMENTS

| | | | |
|---|---|---|---|
| 2,522,416 A * | 9/1950 | Weiskopf | 118/503 |
| 4,129,093 A | 12/1978 | Johnson | |
| 4,820,396 A | 4/1989 | de Masi | |
| 5,023,187 A | 6/1991 | Koebler et al. | |
| 6,020,995 A * | 2/2000 | Dreyer et al. | 359/396 |

(Continued)

FOREIGN PATENT DOCUMENTS

| | | | |
|---|---|---|---|
| DE | 102004022483 B4 | 5/2006 | |
| EP | 1148372 A2 | 10/2001 | |

(Continued)

OTHER PUBLICATIONS

Japanese Office Action with English Translation in co-pending Japanese case, Japanese patent application No. 2014-528926, drafted on Jul. 15, 2015, mailed on Jul. 16, 2015, pp. 1-10.

*Primary Examiner* — Jill Warden
*Assistant Examiner* — Matthew Krcha
(74) *Attorney, Agent, or Firm* — Ventana Medical Systems, Inc.

(57) ABSTRACT

A transfer device (100) comprises a housing (110) defining a chamber (130), carriers (120), and an adjustable spacing mechanism (124). The carriers (120) can be positioned in the chamber (130) and have receiving openings (158). The spacing mechanism (124) is configured to move carriers (120) relative to one another along a chamber (130) to a desired spatial arrangement. Items, such as microscope slides (260), can be transferred between slide holder devices by using the transfer device (100). The pitch of the carriers (120) can be adjusted to receive and dispense slides (260).

8 Claims, 11 Drawing Sheets

(56) References Cited

U.S. PATENT DOCUMENTS

| | | | |
|---|---|---|---|
| 2001/0003652 A1* | 6/2001 | Freeman | 435/286.5 |
| 2002/0153735 A1 | 10/2002 | Kress | |
| 2004/0251796 A1 | 12/2004 | Wood | |
| 2006/0076257 A1* | 4/2006 | Sakal | 206/456 |
| 2008/0187464 A1 | 8/2008 | Guo et al. | |
| 2009/0081014 A1* | 3/2009 | Contes | 414/411 |
| 2010/0058777 A1 | 3/2010 | Walter | |

FOREIGN PATENT DOCUMENTS

| | | |
|---|---|---|
| GB | 2463134 A | 3/2010 |
| JP | H04030552 | 2/1992 |
| JP | H06183512 | 7/1994 |
| JP | H06293401 | 10/1994 |
| JP | H07002308 | 1/1995 |
| JP | H07043278 | 2/1995 |
| JP | H07115123 | 5/1995 |
| JP | H08043380 | 2/1996 |
| JP | H10216538 | 8/1998 |
| JP | H11130254 | 5/1999 |
| KR | 20060071736 | 6/2006 |
| WO | 9920995 A1 | 4/1999 |
| WO | 02072264 A1 | 9/2002 |
| WO | 2011027488 A1 | 3/2011 |

* cited by examiner

SLIDE TRANSFER DEVICE

BACKGROUND

1. Technical Field

The present invention relates generally to substrate holder devices. More specifically, the invention is related to slide transfer devices and methods of using the same.

2. Description of the Related Art

Pathology or histology lab equipment often have slide holders used to load microscope slides into the equipment. Slide holders for one piece of lab equipment may be incompatible with another piece of lab equipment. By way of example, a slide holder for a stainer may be incompatible for an imaging system, a piece of digital pathology equipment, or an automated slide scanner. In laboratories, slides are often transferred between baskets, cassettes, slide racks, and/or magazines to perform, for example, staining through imaging. It is difficult to transfer slides between slide holders because slide holders often have retaining features (e.g., shelves) at different pitches. Slides are often manually transferred one at a time between slide holders. Unfortunately, the manual transfer process is often time-consuming, resulting in reduced lab throughput. Additionally, slides can break or otherwise be damaged if mishandled.

BRIEF SUMMARY

At least some embodiments are directed to a holder device that includes a housing and a plurality of carriers. A spacing mechanism can change the spacing between adjacent carriers to move the carriers to any number of desired spatial arrangements. The carriers can be configured to hold items in the form of substrates (e.g., microscope slides, coverslipped microscopes slides, or the like) or other items for holding sample(s) or specimen(s). In certain embodiments, the carriers are dimensioned to hold specimen-bearing coverslipped slides. For example, each carrier can be dimensioned to hold a single specimen-bearing coverslipped slide.

In some applications, a slide holder device can serve as a transfer device for transferring microscope slides between incompatible slide holders (e.g., slide holders configured to hold slides at substantially different spatial arrangements). Slides held in a first arrangement by a first slide holder can be loaded into the slide holder device. The slide holder device moves the slides from the first arrangement to a second arrangement. The slides in the second arrangement are delivered to a second slide holder.

The slide holder device, in some embodiments, can facilitate rapid transfer of a relatively large number of slides (e.g., 20 slides) from a slide rack to a cassette. The slide rack can be configured for use with dip and dunk equipment, and the cassette can be configured for use with imaging equipment. The slide holder device can adjust to slide spacing of the slide rack and slide spacing of the cassette and, in some embodiments, can include an array of carriers connected together by an expander mechanism. In some embodiments, the expander mechanism is a scissor assembly that carries the carriers. A shell-type housing can surround the expander mechanism and scissor assembly. A rack and pinion gear assembly can be coupled to opposing ends of the scissor assembly to drive the carriers apart or together.

The carriers can be sleeves with a plurality of pins (e.g., two pins on each side) to form linkage points for scissor arms. In some embodiments, there are an inner set and an outer set of scissor arms on each side of the carriers. Two end pieces can have a generally symmetrical design and are coupled to the outermost carriers on opposing ends of the scissor mechanism assembly. When the scissor assembly is in a compressed state, the pitch of the carriers can substantially match the pitch of the slides held by the slide rack.

In some embodiments, a transfer device includes a housing defining a chamber, a plurality of carriers positioned in the chamber, and an adjustable spacing mechanism. The carriers have openings for receiving items. The spacing mechanism, in some embodiments, includes an actuator and a drive apparatus. The drive apparatus couples the actuator to the carriers and is configured to move the carriers relative to one another along the chamber as the actuator is operated.

The actuator, in some embodiments, is movable between a first position and a second position to adjust the spatial arrangement of the carriers. In certain embodiments, the carriers define a first average pitch when the actuator is in the first position. The carriers define a second average pitch when the actuator is in the second position. An expandable device carries the carriers such that adjacent carriers move away from or towards one another when the expandable device moves in response to operation of the actuator. In some embodiments, the expandable device includes one or more scissor mechanisms. The carriers can be in the form of substrate carrier or microscope slide carriers. The expandable device can be directly or indirectly coupled to the actuator.

In some embodiments, a microscope slide holder device comprises a housing, slide carriers, and a drive apparatus. The drive apparatus is coupled to the slide carriers. The drive apparatus has a first state and a second state such that the slide carriers are stationary relative to one another when the drive apparatus is in the first state. The slide carriers move away from one another when the drive apparatus is in the second state. In certain embodiments, a manual actuator is configured to cause the drive apparatus to change from the first state to the second state. In other embodiments, a controller is coupled to the drive apparatus and commands the actuator to be in the first or second states.

A method of moving microscope slides from slide holders comprises transferring a plurality of slides from a first slide holder into respective carriers of an adjustable slide holder device while the carriers define a first spatial arrangement. The carriers are moved relative to one another such that the carriers define a second spatial arrangement that is different from the first spatial arrangement. The microscope slides are transferred from the carriers to respective slide holding features (e.g., slots, shelves, or the like) of a second slide holder device while the carriers are in the second spatial arrangement.

BRIEF DESCRIPTION OF THE SEVERAL VIEWS OF THE DRAWINGS

Non-limiting and non-exhaustive embodiments are described with reference to the following drawings. The same reference numerals refer to like parts or acts throughout the various views, unless otherwise specified.

DETAILED DESCRIPTION

Figure 1:
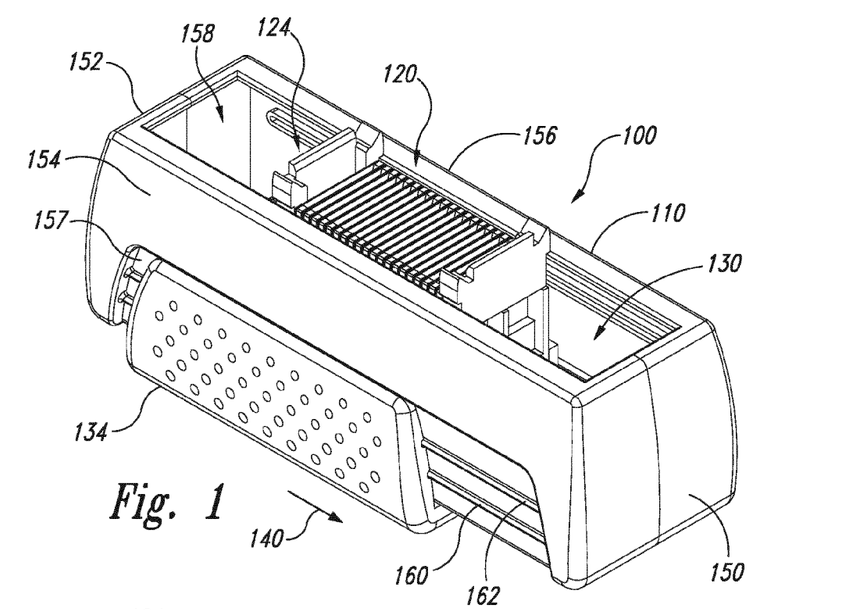
FIG. 1 is an isometric view of a slide transfer device with an expander assembly in a collapsed configuration, in accordance with one embodiment.

FIG. 1 shows a slide transfer device 100 that includes a housing 110, an array of slide carriers 120, and an adjustable spacing mechanism 124. The carriers 120 are positioned within a chamber 130 defined by the housing 110. An actuator in the form of a slider 134 can be moved along the housing 110 to drive the spacing mechanism 124, which in turn moves the carriers 120 away from or towards one another.

Figure 2:
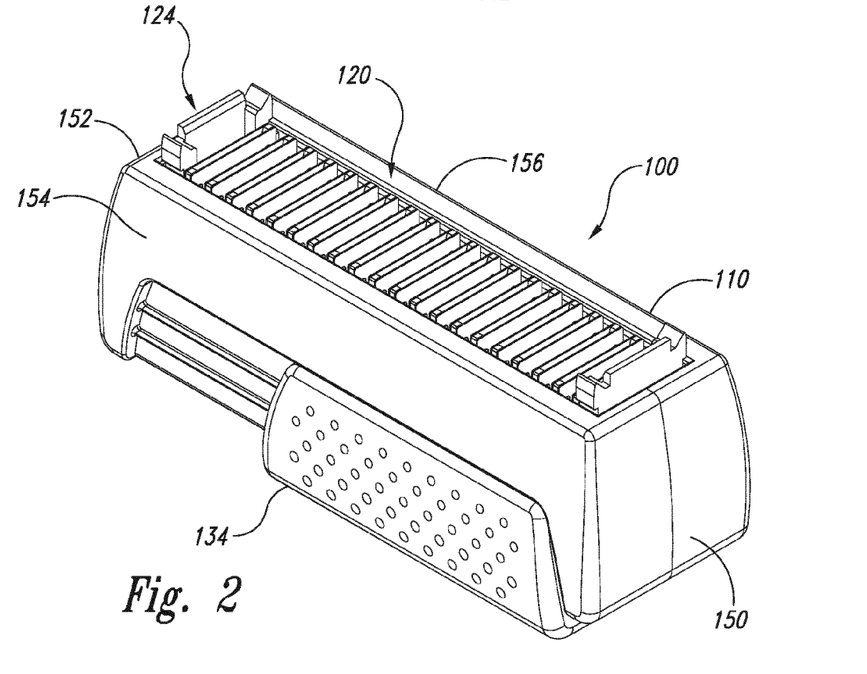
FIG. 2 is an isometric view of the slide transfer device with the expander assembly in an expanded configuration.

A user can manually adjust the pitch of the slide carriers 120 to receive and deliver slides at a wide range of different pitches. When the slider 134 is moved in the direction indicated by an arrow 140, the carriers 120 are moved away from one another. FIG. 2 shows the carriers 120 in a spaced apart linear spatial arrangement. The slide transfer device 100 is portable and can be readily carried (e.g., manually transported) by a person. In a laboratory setting, the slide transfer device 100 can be manually transported between workstations to transfer slides between baskets, cassettes, magazines, or racks, as well as other types of slide holders. Slides can be conveniently transferred between slide holders designed for a wide range of different types of pathology or histology equipment. In some embodiments, 20 slides can be transferred within 1 minute (e.g., less than 10 seconds). Rapid slide transfer may increase lab throughput.

As used herein, the term "slide holder" is a broad term that generally refers to a magazine, a rack, a basket, a cassette, and other carrier or slide holder capable of singulating microscope slides and holding them in a spaced-apart arrangement. In some embodiments, slide transfer device 100 is capable of transferring microscope slides from a first slide holder that holds slides at a first pitch to another slide holder that holds slides at a second pitch. Stainers, cover slippers, imaging systems, and other slide processing equipment often have slide holders with different configurations.

Referring to FIGS. 1 and 2, housing 110 includes a front wall 150, a rear wall 152, and sidewalls 154, 156 and defines a generally rectangular opening 158. Carriers 120 can be moved along the entire longitudinal length of the opening 158. The slider 134 is substantially U-shaped and extends along a base 171 (FIG. 3) and extends along the sidewalls 154, 156. The sidewalls 154, 156 can be generally similar to each other, and accordingly, the description of one applies equally to the other, unless clearly indicated otherwise. The sidewall 154 of FIG. 1 includes a recessed region 157 for receiving the slider 134 and a pair of rails 160, 162 to guide the slider 134.

The housing 110 can be made, in whole or in part, of one or more plastics, polymers, metals, combinations thereof, or the like and can be made using molding processes (including injection molding, compression molding, etc.), machining processes, or combinations thereof. In some embodiments, housing 110 is a clamshell housing that can be coupled together using one or more fasteners (e.g., screws, bolts, male/female connectors, or the like), adhesives, welds, or combinations thereof. The clamshell housing 110 can be conveniently assembled about the internal components. The slider 134 can then be installed on the assembled housing 110.

Figure 3:
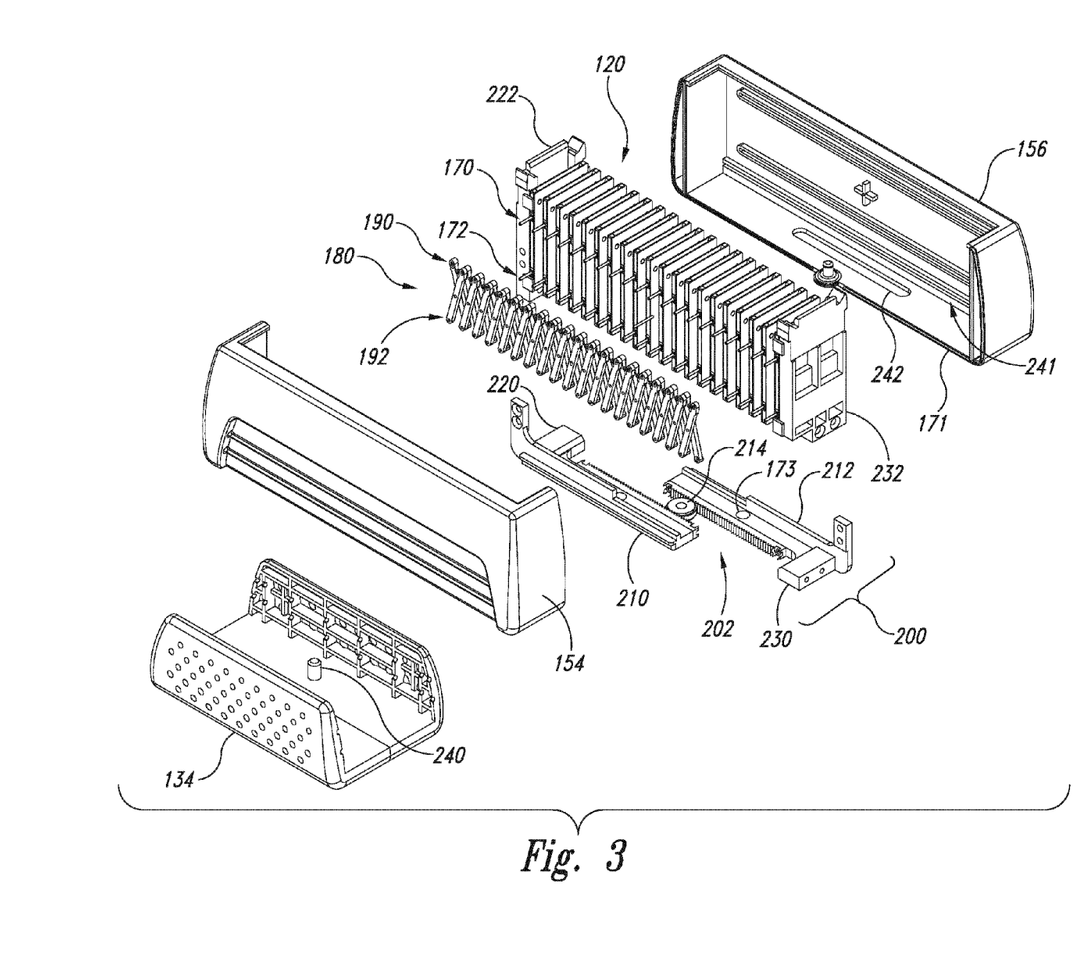
FIG. 3 is an exploded isometric view of the slide transfer device of FIG. 1.

FIG. 3 shows carriers 120 that can be sleeves having a pair of spaced apart generally rectangular plates and spacers sandwiched between the plates. Open ends of the sleeves are dimensioned to receive microscope slides. An upper row of pins 170 and a lower row of pins 172 are coupled to the carriers 120. An expander device, illustrated in the form of at least one scissor mechanism 180, has links coupled to pins 170, 172. The upper pins 170 are rotatably coupled to upper ends 190 of the scissor mechanism 180, and the lower pins 172 are rotatably coupled to lower ends 192 of the scissor mechanism 180. The scissor mechanism 180 can be expanded to move the carriers 120 away from one another. The scissor mechanism 180 can be contracted to move the carriers 120 toward one another while maintaining substantially uniform spacing. Changes in spacing between the adjacent carriers 120 can be proportional relative to a distance the slider 134 moves relative to the housing 110.

As shown in FIG. 3, the upper pins 170 and the lower pins 172 can be fixedly coupled to sides of the carriers 120. In some embodiments, including the illustrated embodiment, the pins 170, 172 extend through and out openings in the scissor mechanism 180.

A drive apparatus 200 includes the scissor mechanism 180 and a rack and pinion assembly 202. The rack and pinion assembly 202 includes a pair of racks 210, 212 and a pinion 214. A mounting end 220 of the rack 210 is coupled to a receiver 222. A mounting end 230 of the rack 212 is coupled to a receiver 232. Each of the racks 210, 212 includes a rack gear that enmeshes the pinion 214. A pin 240 of the slider 134 can pass through a slot 242 in the base 171 and into an opening (e.g., a slot or a hole 173) in the rack 212. The pin 240 can be translationally fixed to the rack 212. As the slider 134 translates, rack 212 moves along a slot 241 of the housing 110.

Figure 4:
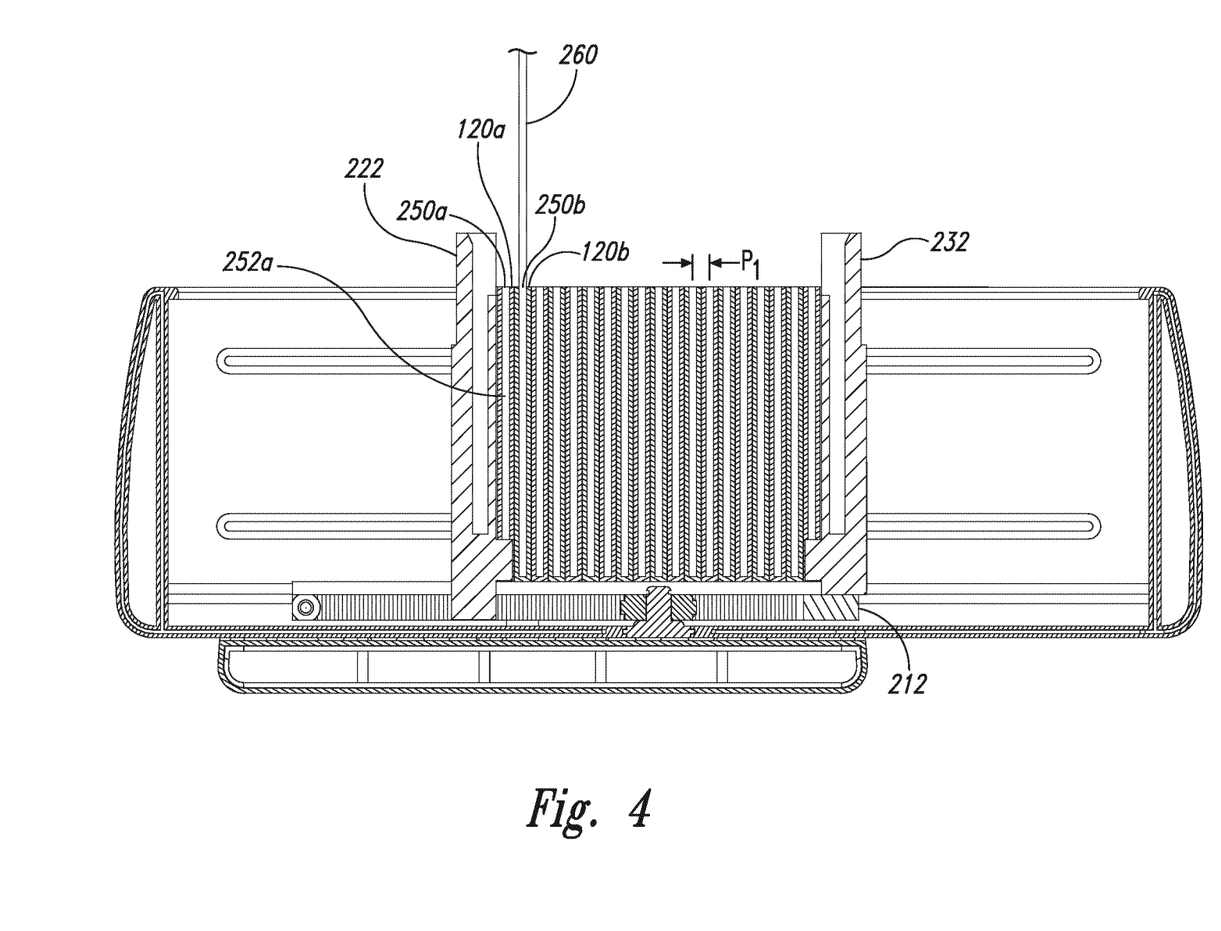
FIG. 4 is a cross-sectional view of the slide transfer device of FIG. 1.

Referring to FIG. 4, carriers 120 can be generally similar to each other, and accordingly, the description of one applies equally to the others, unless clearly indicated otherwise. The carrier 120a is coupled to the receiver 222. A microscope slide can be inserted through a slide receiving opening 250a and into an elongated chamber 252a. A microscope slide 260 is located in the carrier 120b. In some embodiments, the width of the slide receiving openings can be slightly greater than the thickness of the slides. If the slides are conventional slides, the widths of the slide receiving openings can be in a range of about to about 1 mm to about 2.5 mm. The slide receiving openings 250 can have longitudinal lengths in a range of about 25 mm to about 30 mm. The distance between sidewalls of the carrier 120b can be relatively small to ensure that the microscope slide 260 cannot move a significant amount with respect to the carrier 120b.

Figure 5:
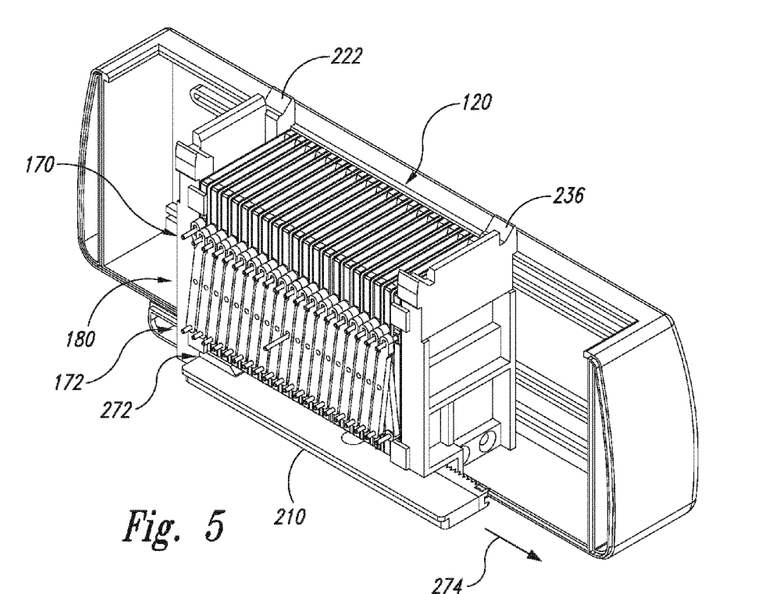
FIG. 5 is a partially cutaway isometric view of a slide transfer device, in accordance with one embodiment.
Figure 6:
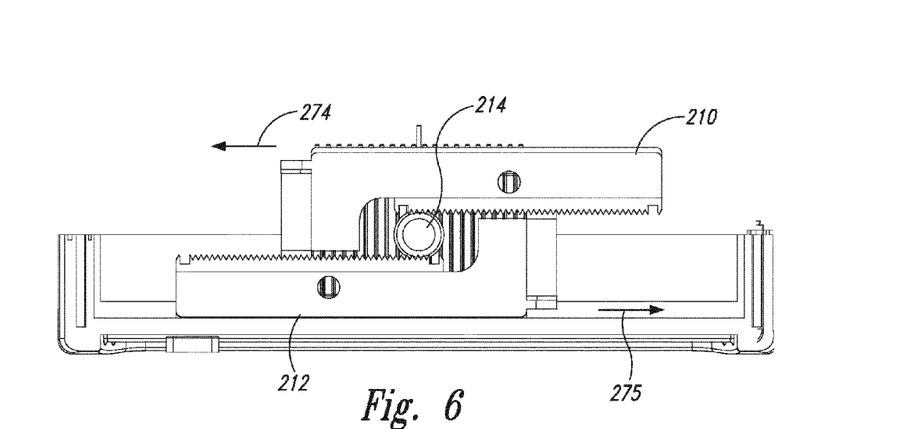
FIG. 6 is a bottom view of the slide transfer device of FIG. 5.

Referring to FIGS. 5 and 6, as the rack 212 translates, teeth of the rack gear cause rotation of the pinion 214. The rotating pinion 214 causes translation of the rack 210. As the rack 210 translates in the direction indicated by an arrow 274, the rack 212 translates in the opposite direction as indicated by an arrow 275. In this manner, racks 210, 212 translate in opposite directions.

Figure 7:
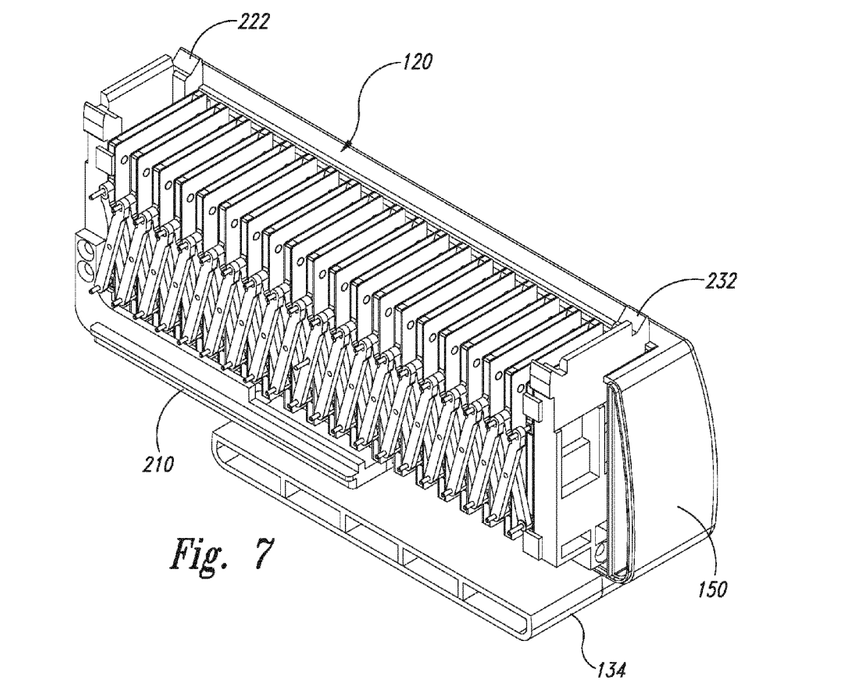
FIG. 7 is a partially cutaway isometric view of a slide transfer device with slide carriers in a spaced-apart arrangement, in accordance with one embodiment.
Figure 8:
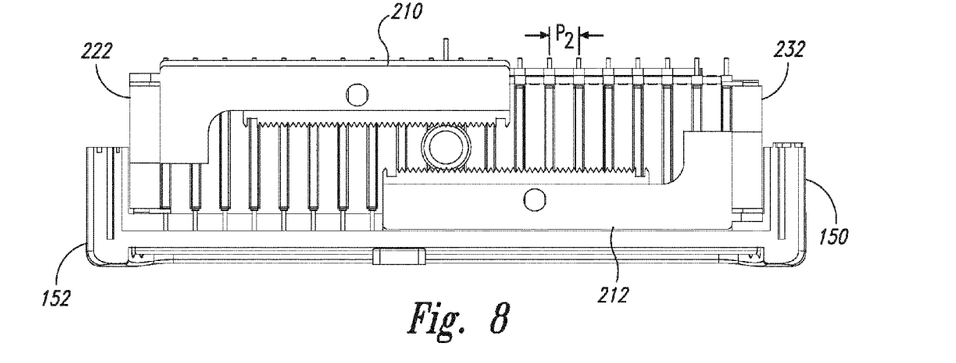
FIG. 8 is a bottom view of the slide transfer device of FIG. 7.

Referring to FIGS. 2, 7, and 8, racks 210, 212 can position the receivers 222, 232 at opposing ends of the opening 158. The receiver 222 is proximate to the rear wall 152. The receiver 232 is proximate to the front wall 150. The pitch $P_2$ of the carriers 120 in FIG. 8 is substantially different from the pitch $P_1$ of the carriers 120 in FIG. 4. By way of example, in some embodiments, pitch $P_2$ is at least 10% greater than pitch $P_1$. In other embodiments, pitch $P_2$ can be at least 50%, 100%, 200%, or 300% greater than pitch $P_1$. Other changes in pitch are also possible, if needed or desired. The slider 134 illustrated in FIG. 2 can be returned to the position illustrated in FIG. 1 to bring the carriers 120 back together. The slider 134 can also be located between the illustrated positions of FIGS. 1 and 2 to obtain an intermediate spacing of the carriers 120.

Figure 9:
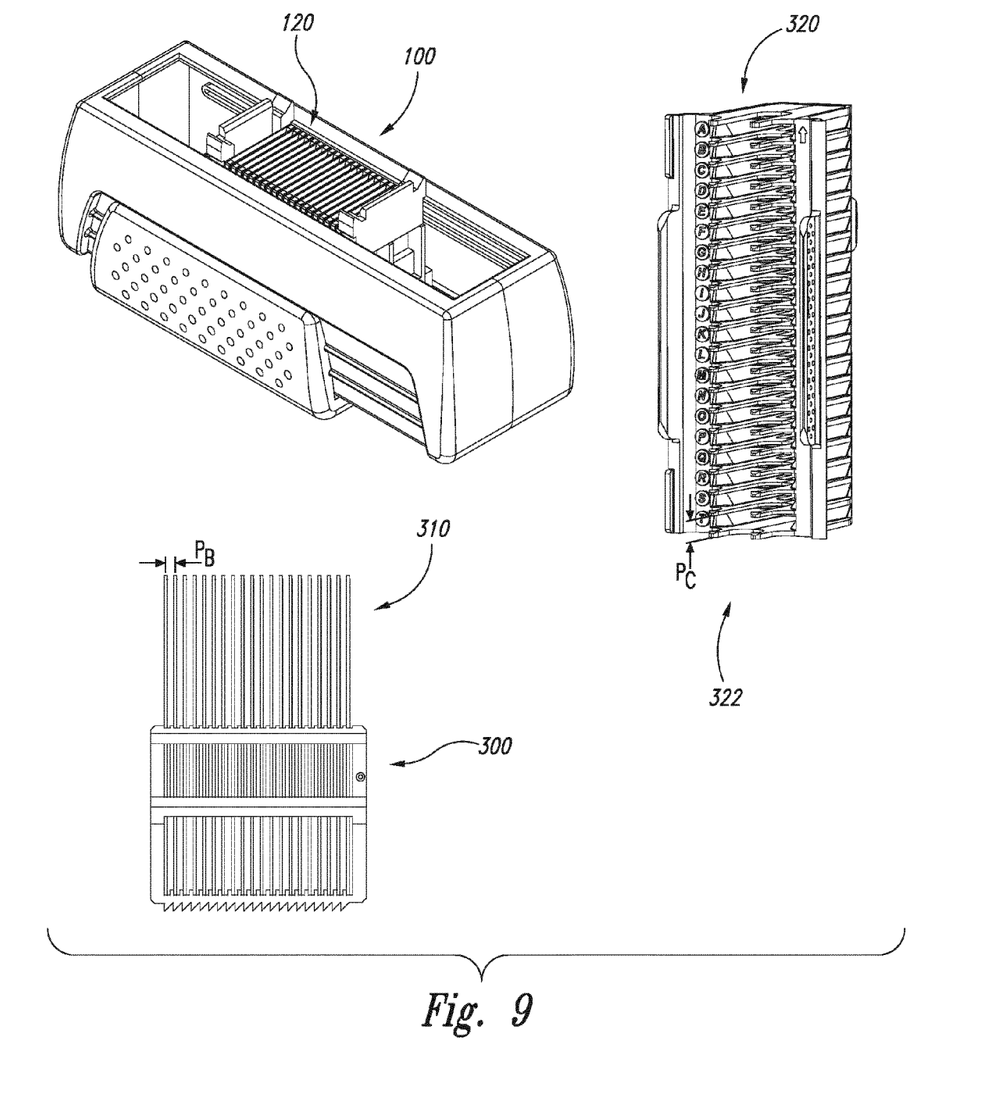
FIG. 9 shows a basket holding slides, an empty cassette, and a slide transfer device.

Referring to FIG. 9, slide transfer device 100 can conveniently transfer microscope slide 310 from a basket 300 to a cassette 320. Ends of the slides 310 can be inserted into respective carriers 120. After removing the basket 300, the carriers 120 can be moved to generally match the spacing of shelves 322 of the cassette 320. The slides 310 can then be transferred to the cassette 320. To reduce transfer times, the slides 310 can be simultaneously transferred from the basket 300 to the slide transfer device 100 and can also be simultaneously transferred from the slide transfer device 100 to the cassette 320.

The basket 300 can be a slide rack used in dip and dunk machines. Dip and dunk machines process samples in batches by submerging racks carrying closely spaced apart microscope slides in open baths. One slide rack is a SAKURA® basket. The basket 300 can have tabs, slots, spacers, or other slide positioning features. The pitch $P_B$ of the slides 310 can be relatively small, making it difficult to transfer the slides 310 to the cassette 320 having a different pitch. The cassette 320 can have shelves 322 that define a pitch $P_C$ that is substantially different from the pitch $P_B$. By way of example, the pitch $P_C$ can be two times, three times, four times, five times, or ranges encompassing such pitches of the pitch $P_B$.

The slides 310 can carry different types of biological samples. A biological sample can be a tissue sample (e.g., any collection of cells) removed from a subject, plant, or the like. In some embodiments, a biological sample includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample. Alternatively, biological samples can be a section of a plant, plant tissue culture, or the like.

Microscope slides can be substantially flat substrates. "Substantially flat substrate" refers, without limitation, to any object having at least one substantially flat surface, but more typically to any object having two substantially flat surfaces on opposite sides of the object, and even more typically to any object having opposed substantially flat surfaces, which opposed surfaces are generally equal in size but larger than any other surfaces on the object. A substantially flat substrate can be formed of any suitable material, including glass, silicon, a semiconductor material, metal, combinations thereof, or the like. Non-limiting examples of substantially flat substrates include conventional slides (both 1 inch×3 inch microscope slides and 25 mm×75 mm microscope slides), SELDI and MALDI chips, silicon wafers, or other generally planar objects with at least one substantially flat surface. The slides can be coverslipped. By way of example, the slides 310 in FIG. 9 can be specimen-bearing slides carrying coverslips.

Slides can include labels with machine-readable code (such as a one- or multi-dimensional barcode or infoglyph, an RFID tag, a Bragg-diffraction grating, a magnetic stripe or a nanobarcode) with coded instructions that specify the type, sequence, timing of the liquid(s) delivered for treatment of a particular specimen, or the like.

Figure 10:
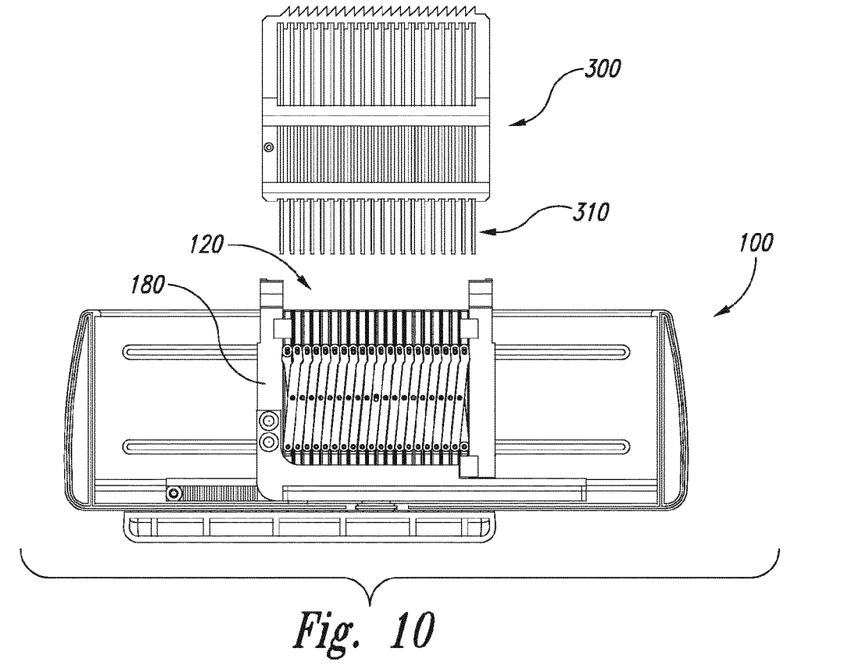
FIG. 10 shows slides carried by a basket ready to be inserted into slide carriers of a slide transfer device.

FIGS. 10-15 show a method of transferring slides. Referring to FIG. 10, the scissor mechanism 180 is in the compressed state such that the pitch of the carriers 120 is substantially equal to the pitch of the slides 310. The slides 310 can be aligned with and inserted into the receiving openings of the carriers 120. Most or substantially all of the portions of the slides protruding out of the basket 300 can be moved into the carriers 120.

Figure 11:
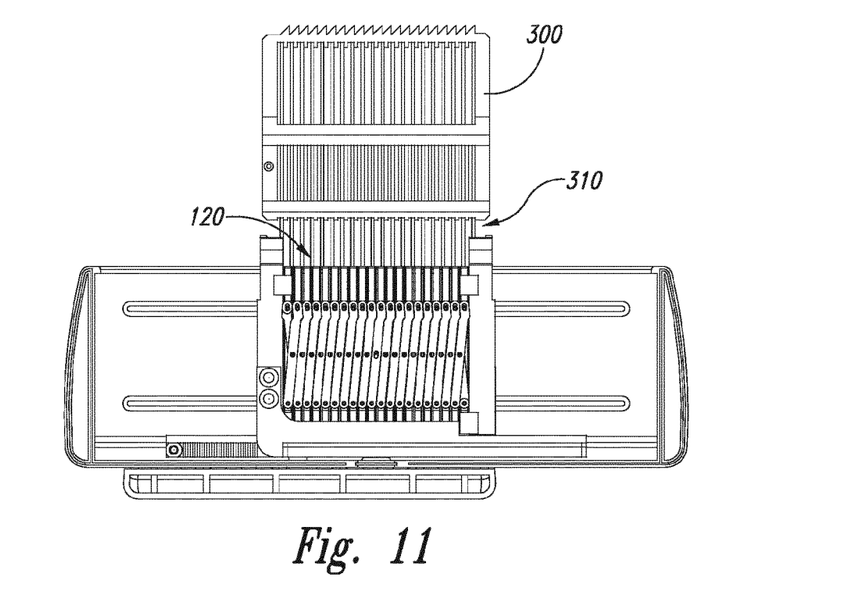
FIG. 11 shows slides inserted into respective slide carriers.

FIG. 11 shows the singulated slides 310 positioned in the slide carriers 120. Each carrier 120 can hold one slide. After the ends of the slides 310 are within respective carriers 120, the mated basket 300 and slide transfer device 100 can be rotated approximately 180 degrees to allow the slides 310 to slide from the basket 300 into the carriers 120. Once all of the slides 310 have been loaded into the carriers 120, the basket 300 can be slowly pulled away from the slides 310. In this manner, all or substantially all of the slides 310 can be simultaneously transferred from the basket 300 to the slide carriers 120.

Figure 12:
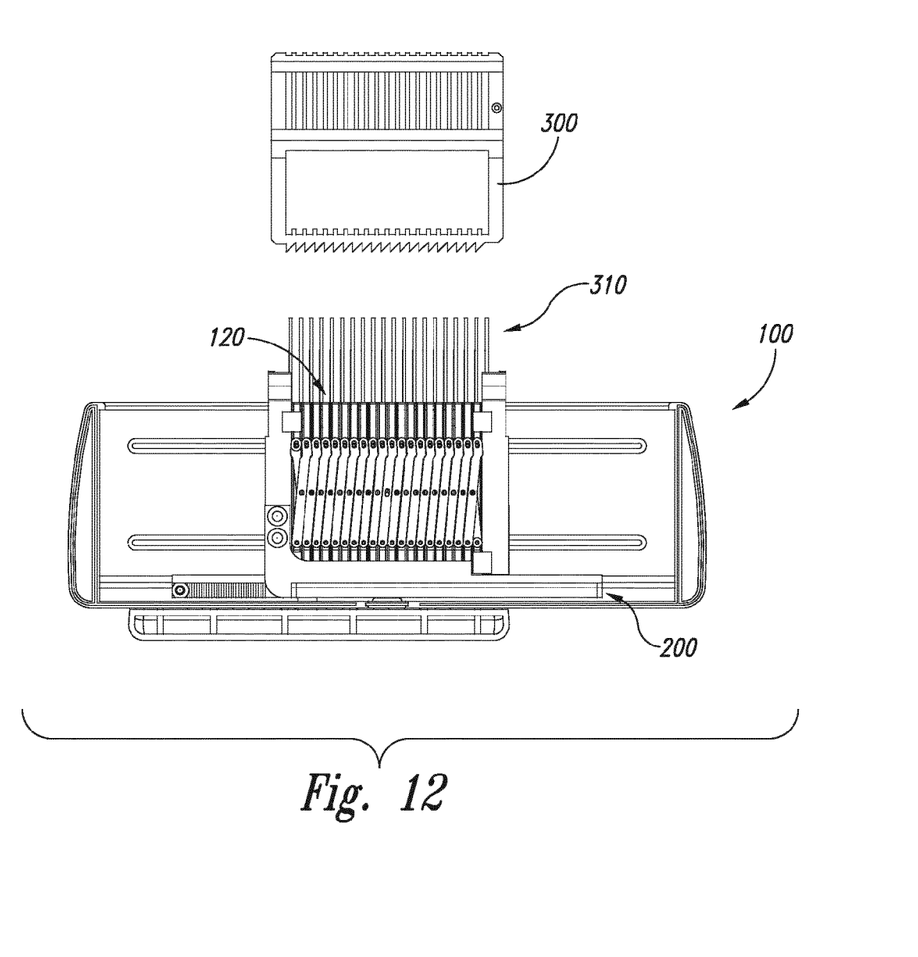
FIG. 12 shows the basket spaced apart from slides carried by carriers of the slide transfer device.

FIG. 12 shows the basket 300 separated from the slides 310. The slides 310 are ready to be moved to a desired spacing. A user can manually grasp and move the slider 134. The drive apparatus 200 increases the spacing between adjacent slides 310 until the slides are moved to a pitch that is substantially equal to a pitch of receiving openings of the slide cassette 320.

Figure 13:
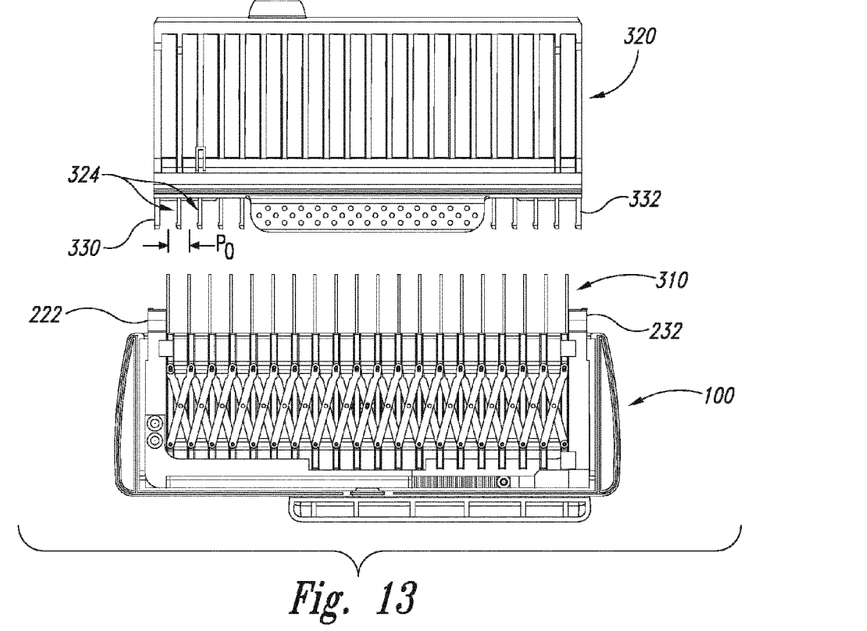
FIG. 13 shows slides ready to be inserted into a cassette.

FIG. 13 shows the slides 310 ready to be loaded into the cassette 320. The cassette 320 is aligned with the transfer device 100. The pitch of the slides 310 can be substantially equal to a pitch $P_O$ of openings 324 of the cassette 320. A user can move the slider 134 to adjust the spacing of the slides 310 to a desired arrangement suitable for transfer to the cassette 320.

Figure 14:
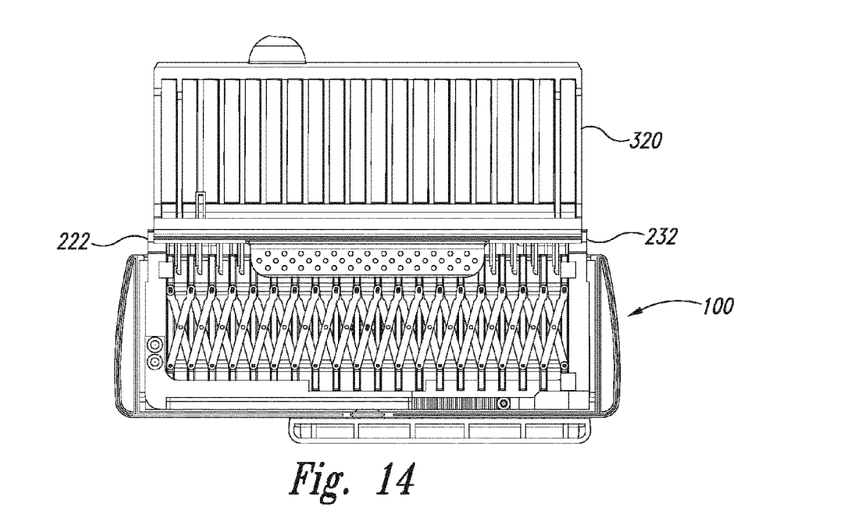
FIG. 14 shows slides inserted into the cassette.

Positioners 330, 332 can be inserted into the respective receivers 222, 232. FIG. 14 shows the receivers 222, 232 holding the respective features 330, 332 to inhibit, limit, or substantially prevent movement of the cassette 320 relative to the slide transfer device 100. This can help avoid damage to the slides 310. The mated slide transfer device 100 and cassette 320 can be rotated approximately 180 degrees to allow the slides to slide out of the slide transfer device 100 to the cassette 320.

Figure 15:
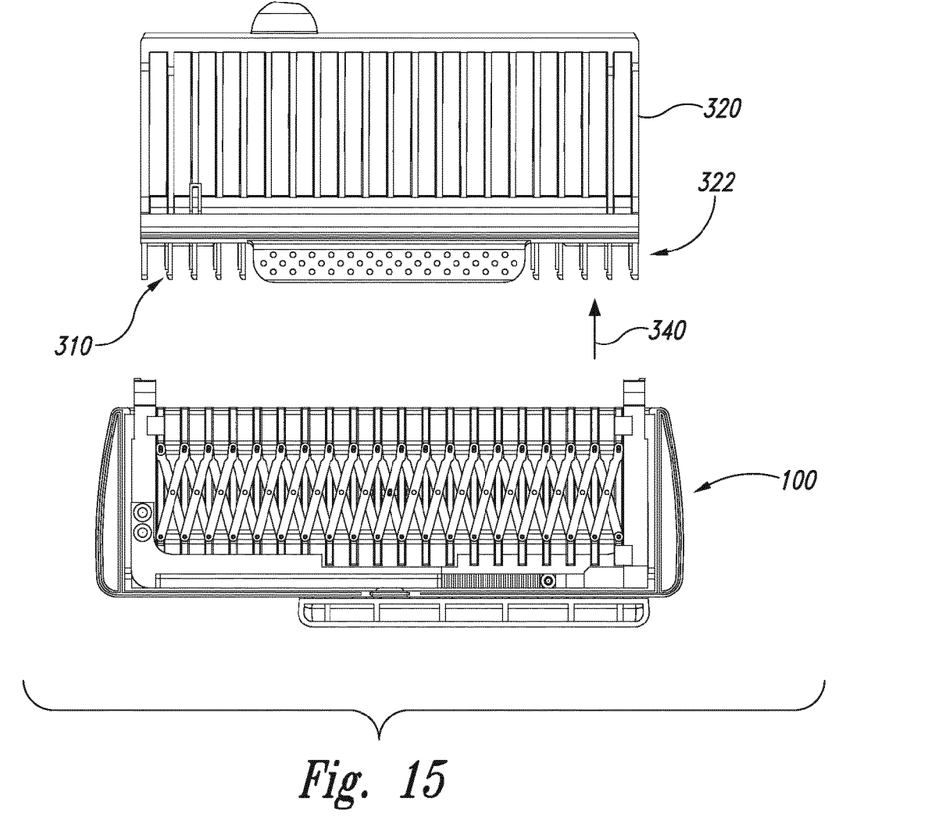
FIG. 15 shows the slide transfer device and cassette after the slide transfer device has been moved away from the cassette.

As shown in FIG. 15, the slide transfer device 100 can be moved away from the loaded cassette 320, as indicated by an arrow 340, leaving the slides 310 on the shelves 322. The loaded cassette 320 can be transported to a desired location.

The transfer process can be performed in a relatively short period of time. In some applications, the transfer process can take less than about 15 seconds. As such, the transfer process can be much faster than manually moving slides one at a time between the basket 300 and the cassette 320. The process can be reversed to transfer the slides from the cassette 320 back to the basket 300, if needed or desired. Other types of techniques can be used to transfer slides slide holders.

Figure 16:
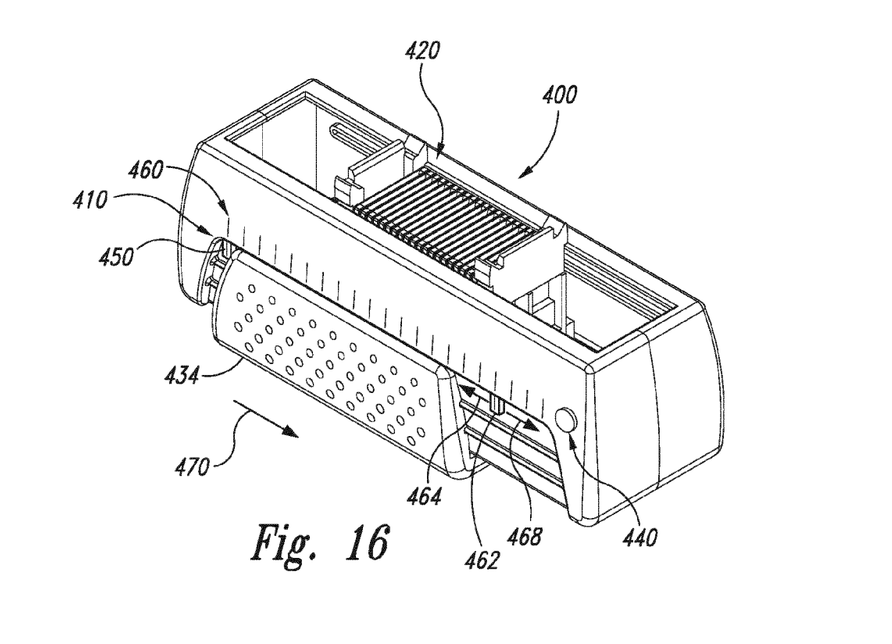
FIG. 16 is an isometric view of a slide transfer device, in accordance with one embodiment.

FIG. 16 shows a slide transfer device 400 that is generally similar to the slide transfer device 100 discussed in connection with FIGS. 1-15, except as detailed below. The slide transfer device 400 includes a control assembly 410 configured to control the pitch of carriers 420. A user can set the pitch of the carriers 420 when an actuator 434 is in an initial position, as well as the pitch of the carriers 420 when the actuator 434 is in an end position. A reset device 440, illustrated as a reset button, can be used to reset the settings.

The illustrated control assembly 410 includes a stop 450 for setting the minimum pitch of the carriers 420. Indicia 460 can be used to position the stop 450. The indicia 460 can be in the form of measurement indicia with lines and associated reference numerals. Lookup tables can be used to correlate a desired pitch to a desired setting of the stop 450.

A second stop 462 can be used to set a second position (e.g., an end position) of the actuator 434. In some embodiments, including the illustrated embodiment of FIG. 16, the second stop 462 can be moved in the direction indicated by the arrows 464, 468 to set the maximum pitch of the carriers 420.

Once the stops 450, 462 are positioned, the button 440 can be depressed to lock the stops 450, 462. The locked stops 450, 462 set the path of travel of the actuator 434. To reposition the stops 450, 462, the button 440 can be depressed. A user can manually slide the stops 450, 462 to new positions. The stops 450, 462 can be locked in place by depressing the button 440. In this manner, the slide transfer device 400 can be conveniently operated at different pitch settings.

Figure 17:
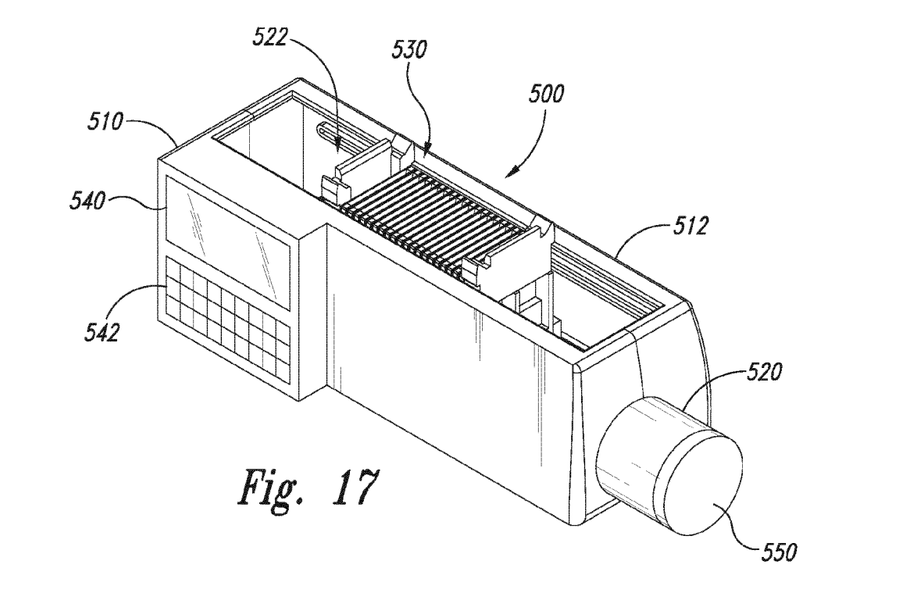
FIG. 17 is an isometric view of an automated slide transfer device, in accordance with one embodiment.

FIG. 17 shows an automated slide transfer device 500 including a controller 510 coupled to a housing 512. The controller 510 commands a drive device 520, which in turn causes movement of a spacing mechanism 522 to accurately position the carriers 530. The controller 510 includes a display 540 and an input device 542. The display 540 can be a screen or other display device. The input device 542 can include, without limitation, one or more buttons, keyboards, input pads, control modules, or other suitable input elements. Additionally or alternatively, the input device 542 can have transmitters, receivers, or both, to wirelessly communicate with equipment.

The controller 510 can also generally include, without limitation, one or more central processing units, processing devices, microprocessors, digital signal processors, central processing units, processing devices, microprocessors, digital signal processors (DSP), application-specific integrated circuits (ASIC), readers, and the like. To store information, the controller 510 can also include, without limitation, one or more storage elements, such as volatile memory, non-volatile memory, read-only memory (ROM), random access memory (RAM), and the like. Stored information can include, without limitation, a manufacturer's information (e.g., information about slide holders produced by different manufacturers, recommended pitch settings from the manufacturer, etc.), carrier spacing information, executable code or programs, or the like. The controller 510 can be programmed based on the desired position of the carriers 530. A user can enter information about the slide holders which the slide transfer device 500 will use to transfer the slides. The controller 510 can determine an appropriate pitch of the carriers 530.

The drive device 520 can be a motor that receives energy from a power source 550. In some embodiments, the drive device 520 is a stepper motor that receives electrical energy from the power source 550 in the form of one or more batteries. The power source 550 can be coupled directly to the drive device 520. In other embodiments, the drive device 520 and/or power source 550 are positioned within the housing 512. The drive device 520 can move the actuating mechanism 522 in response to one or more signals from the controller 510 or signals from sensors. The drive device 520 can be a drive motor, a stepper motor, or the like.

Other types of drive apparatuses can also be employed and can include, without limitation, carriages, linear slides, gears, belts, power sources (e.g., batteries, power supplies, or the like), motors, or combinations thereof. The transfer devices have been discussed in the context of holding microscope slides. However, the transfer devices can be used with other types of objects, including substrates or other items for holding specimen(s) for examination using equipment, such as optical equipment, e.g., a microscope.

It should be noted that, as used in this specification and the appended claims, the singular forms "a," "an," and "the" include plural referents unless the content clearly dictates otherwise. Thus, for example, reference to a slide transfer device including "a scissor mechanism" includes a single scissor mechanism, or two or more scissor mechanisms. It should also be noted that the term "or" is generally employed in its sense including "and/or" unless the content clearly dictates otherwise.

The various embodiments and features described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A microscope slide transfer device, comprising:
a housing defining a chamber;
a plurality of slide carriers positioned in the chamber, the slide carriers having respective slide receiving openings;
an expander comprising a scissor assembly;
an actuator, wherein the actuator and the expander are coupled and movable in response to movement of the actuator to adjust the spatial arrangement of the carriers between a first position in which the carriers are in a collapsed configuration and a second position in which the carriers are in an expanded configuration, and
a drive apparatus comprising a rack and pinion assembly coupling the actuator to the expander, wherein the drive apparatus changes the spacing between the slide receiving openings of adjacent slide carriers proportionally relative to a distance the actuator moves relative to the housing and is configured to be movable between a first state wherein the slide carriers are stationary relative to one another and a second state wherein the slide carriers move away from or towards one another when the drive apparatus is in the second state.

2. The microscope slide transfer device of claim 1, wherein the expander includes a first scissor mechanism and a second scissor mechanism, and the plurality of slide carriers are positioned between the first scissor mechanism and the second scissor mechanism.

3. The microscope slide transfer device of claim 1, wherein the rack and pinion assembly includes a first rack coupled to one end of the expander, a second rack coupled to an opposing end of the expander, and a pinion positioned between the first rack and the second rack to drive the first rack and the second rack in opposite directions.

4. The slide holder device of claim 1, wherein the drive apparatus is capable of moving adjacent slide carriers away from or towards one another.

5. The slide holder device of claim 1, wherein the first average spacing is at least 10 percent less than the second average spacing.

6. The microscope slide transfer device of claim 1, wherein the actuator causes the drive apparatus to move between the first state and the second state to increase or decrease the spacing defined by the plurality of slide carriers.

7. The slide holder device of claim 6, further comprising:
a controller coupled to the drive apparatus, and the controller is configured to command the drive apparatus to be in the first state or the second state.

8. The slide holder device of claim 1 wherein the actuator comprises a controller coupled to the drive apparatus wherein the controller commands the actuator to be in a first or second state.

* * * * *